United States Patent [19]

Edwards

[11] Patent Number: 4,623,833
[45] Date of Patent: Nov. 18, 1986

[54] ALTERNATOR SYSTEM MULTIFUNCTION FAULT DETECTOR

[75] Inventor: Arthur J. Edwards, Hoffman Estates, Ill.

[73] Assignee: Motorola, Inc., Schaumbrug, Ill.

[21] Appl. No.: 687,603

[22] Filed: Dec. 31, 1984

[51] Int. Cl.⁴ .............................................. H02J 7/14
[52] U.S. Cl. ...................................... 322/28; 322/99; 322/7; 320/64; 361/90; 361/21
[58] Field of Search ................ 322/99, 28, 7; 361/90, 361/21, 86, 92, 111; 340/661, 662, 663; 320/64, 61

[56]       References Cited
       U.S. PATENT DOCUMENTS 4,360,772  11/1982  Voss .................................. 322/99 X
4,379,990   4/1983  Sievers et al. ........................ 322/99

Primary Examiner—Patrick R. Salce
Assistant Examiner—Mark D. Simpson
Attorney, Agent, or Firm—Margaret M. Parker; James W. Gillman

[57]        ABSTRACT

Three possible types of "faults" may be detected in the ignition system of a vehicle, using simple combinational logic to provide an essentially error-free activation of an indicator when a true fault is present. "Fault" signals which mean non-rotation of the alternator, broken cables or short circuits and the like are distinguished from transient and less significant conditions. The latter conditions are prevented from activating the indicator. A single indicator lamp serves to alert the user to a serious fault requiring service.

3 Claims, 6 Drawing Figures

ALTERNATOR SYSTEM MULTIFUNCTION FAULT DETECTOR

BACKGROUND OF THE INVENTION

This invention relates to the field of alternator systems and, more particularly, to a multifunction fault detector for use in vehicular alternator systems.

In certain automobile markets, it is desired to provide for the detection and indication of a number of possible alternator system faults by means of a single lamp. Such a system must have, not only reliability, but essentially error-free operation. That is, temporary conditions of overvoltage or undervoltage which are not due to a fault requiring service are to be ignored, and the transient pulses which are normal to automobile ignition systems must not cause false indications.

There are three main fault conditions which it is desirable to detect and indicate; "non-rotation of the alternator", "overvoltage" and "undervoltage". As will be explained hereinafter, there are a number of possible causes for these three indications, but for now it will suffice to say that, for any of these three types of fault, a lamp will be lit with a single accompanying legend such as "CHECK ENGINE". In many designs in the prior art, the detection of "rotation", or apparent lack of alternator output, was done by adding three rectifier diodes to the rectifier stage and detecting the resulting DC or lack thereof. Not only was this method expensive but it was also error-prone since the circuits were sensitive to leakage from the main rectifier diodes.

When detecting an overvoltage condition, it is also important to distinguish between a transient overvoltage condition due, for example, to an abrupt drop in the load with a fully charged battery, and a true overvoltage condition due to an actual fault in the system such as a short-to-ground in the field coil.

When detecting an "undervoltage" condition, it is necessary to distinguish between a temporary low voltage, such as would occur when the load on the system exceeds the generating capacity and pulls the battery voltage down, and an actual fault such as a broken wire between the alternator and the battery.

SUMMARY

It is, therefore, an object of this invention to provide multifunction fault detection and indication circuitry as for use in the alternator system of a vehicle.

It is a particular object to provide such circuitry which will essentially eliminate false indications when no actual fault is present in the system.

It is yet another object to provide a circuit for lighting an indicator lamp which can be enabled by a brief pulse.

It is still another object to provide such circuitry with minimum expense and complexity, preferably with all or most of the elements contained in one integrated circuit.

These objects and others which will become apparent are obtained in a circuit which utilizes combinational logic circuits and latching circuits and which is synchronously clocked with the regulating period of a fixed frequency regulator. False readings of "undervoltage" or "overvoltage" are prevented by, in each case, detecting two different status signals at the same time. No "fault" indication will be enabled unless both signals indicate that a true fault is present. In the case of "non-rotation", "fault" detection is obtained by the use of an AC signal from the alternator winding. This signal is compared with a reference voltage in a comparator with hysteresis to avoid errors due to residual DC. The pulses derived by each of the detection circuits are gated to a flip flop which is clocked in synchronism with the regulation period of the system. The resulting latched signal enables the control circuit of an indicator lamp.

DETAILED DESCRIPTION OF A PREFERRED EMBODIMENT

Figure 1:
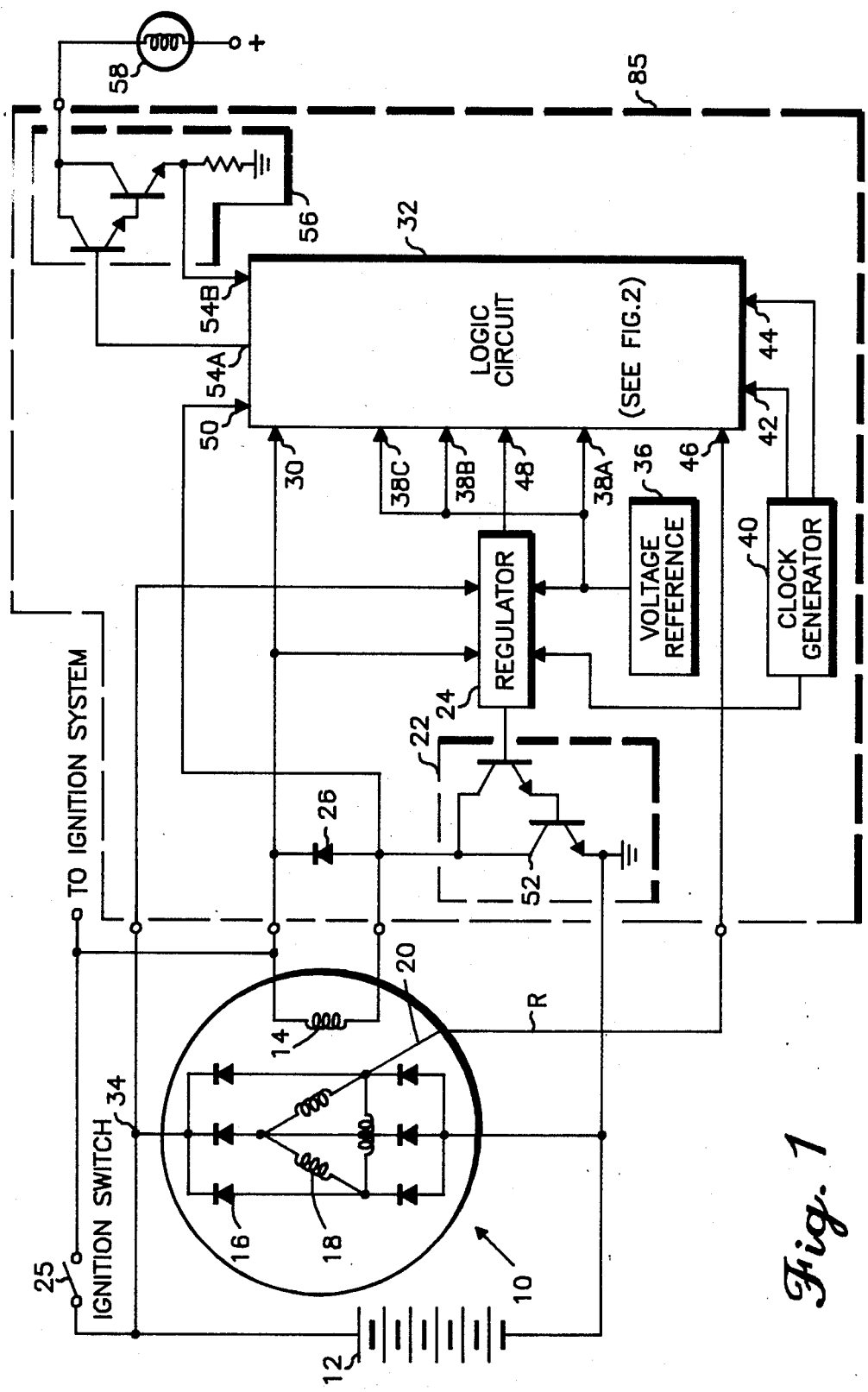
FIG. 1 a diagram of an alternator system embodying the present invention.

In the diagram of FIG. 1 an alternator system is shown, including an alternator 10, battery 12, field coil 14 and rectifiers 16. The alternator 10 is shown here with a delta-connected winding 18, but this is not necessary for the invention. A tap 20 is connected to one corner of the delta winding 18 and provides an AC output signal which will be discussed later. A Darlington circuit 22 is the drive circuit for the field coil 14 and is controlled by the output of a regulator circuit 24. The specific design of the regulator 24 is not particularly relevant to this invention. An ignition switch 25 may be connected to couple the alternator/battery output to the rest of the vehicle's ignition system (not shown).

The field coil 14 and its associated diode rectifier 26 are coupled to the regulator circuit 24 and to an "undervoltage" input terminal 30 of a logic circuit 32. The logic circuit is shown in and explained with respect to FIG. 2. Another input to the regulator circuit 24 comes from a point 34 on the alternator 10. The signal at this point is sometimes termed the alternator "sense" signal and is a composite of the rectifier 16 output and the battery 12 voltage. A voltage reference source 36 is coupled to the regulator circuit 24 and to three inputs 38A, 38B and 38C of the logic circuit 32. A clock generator 40 is coupled to the regulator 24 and to two inputs 42,44 of the logic circuit 32. The tap 20 on the alternator winding 18 is coupled to an input 46 of the logic circuit. An output from the regulator 24 is coupled to an "overvoltage" input 48 of the logic circuit 32. Another input 50 to the logic circuit 32 comes from a terminal 52 on the collector of the Darlington circuit 22. Terminals 54A,54B from the logic circuit 32 are connected to a second Darlington circuit 56 which controls an indicator 58, typically a lamp.

Figure 2:
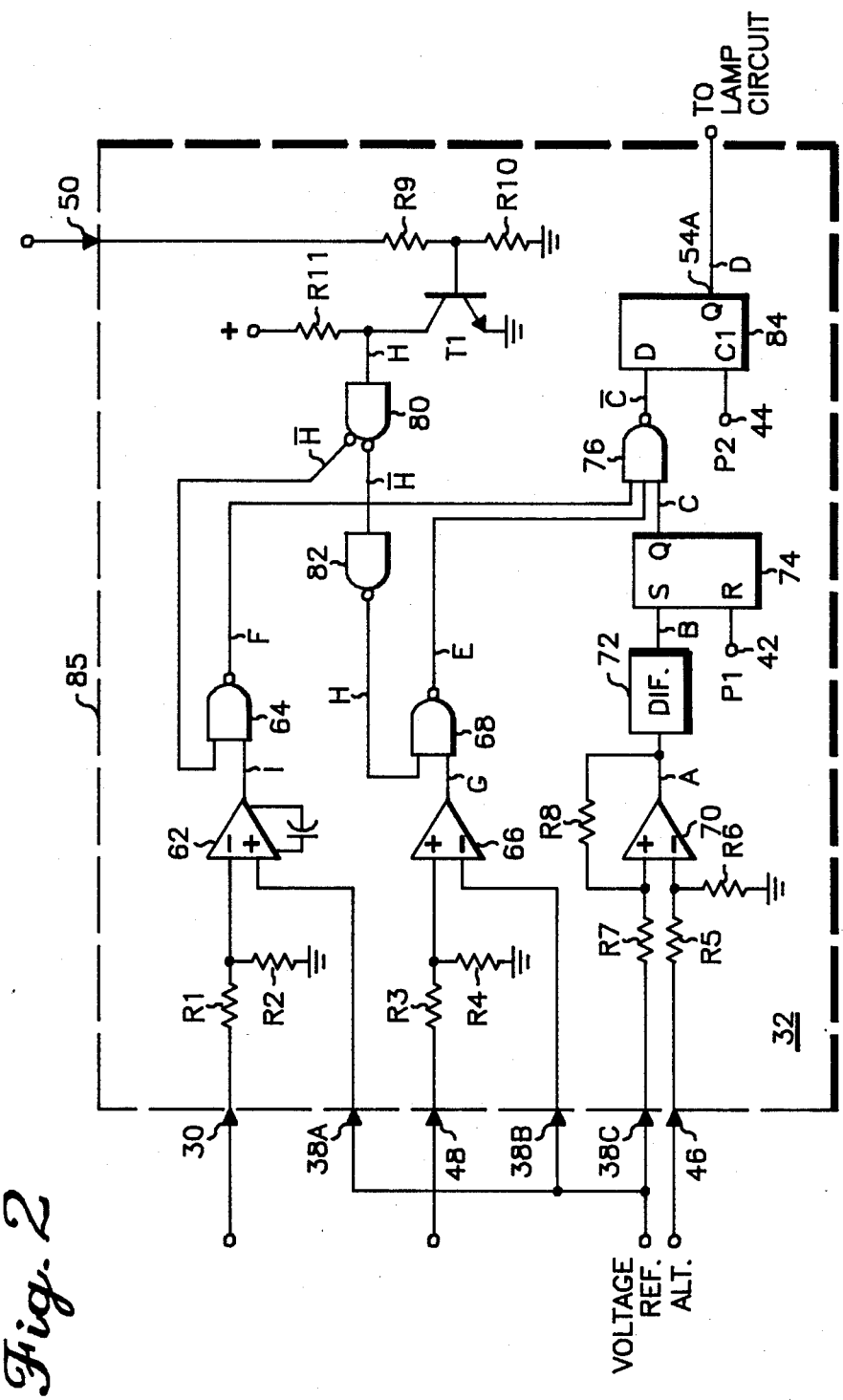
FIG. 2 is a logic diagram of the circuit of the invention.

In FIG. 2, the logic circuit 32 is shown with the various input and output terminals numbered as in Fig. 1. The logic circuit was designed to be contained on an integrated circuit chip which, preferably, will include most of the regulator control ciruitry. Thus, for example, few capacitors are required for this circuit. The "undervoltage" input terminal 30 is coupled through a resistor network R1, R2 to an "undervoltage" comparator 62. A second input to the comparator 62 comes from the reference terminal 38A, and the output of the comparator is coupled to a NAND gate 64. The "overvoltage" terminal 48 is coupled through a network R3, R4 to an "overvoltage" comparator 66. A second input to the comparator 66 comes from the reference terminal 38B, and the output of the comparator is coupled to a NAND gate 68. The tap 20 on the winding 18 is coupled to an input 46 of the logic circuit 32.

Figure 6:
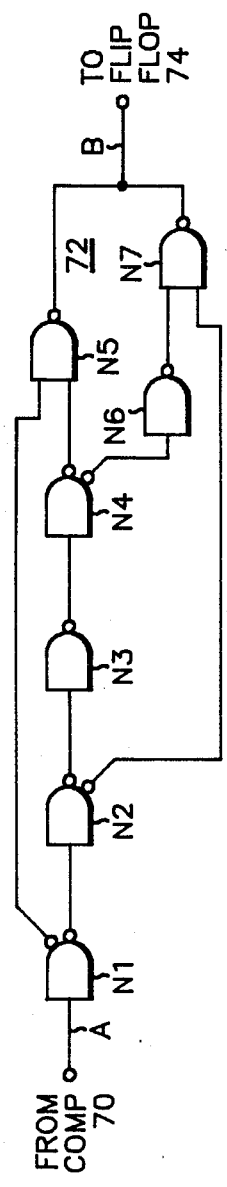
FIG. 6 is a logic diagram of a preferred embodiment for one element of FIG. 2.

Terminal 46 is coupled through a resistor network R5,R6 to a "rotation" comparator 70. A second input to the comparator comes from the reference terminal 38C, and the comparator output is coupled to a differentiator 72. The differentiator not only provides AC coupling, eliminating the possibility of error due to rectifier leakage, but also serves as a frequency doubler. FIG. 6 shows a 7-gate implementation for the differentiator 72. The output of the differentiator is coupled to the "set" input of a flip-flop 74, and the terminal 42 feeds a clock pulse P1 to the "reset" input during each regulation period. The flip-flop 74 output is coupled to one input of a NAND gate 76. Second and third inputs to the NAND 76 come from the NAND gates 64 and 68, respectively.

The logic circuit input terminal 50, which comes from the collector terminal 52 of the Darlington circuit 22 (see FIG. 1), is coupled through a resistor network R9,R10 to the base of a transistor T1, the collector of which is coupled to a NAND gate 80. The output of the NAND 80 is coupled to a second input of the NAND 64 and to a NAND gate 82, the output of which is coupled to a second input of the NAND 68. A flip-flop 84, which has a data input from the NAND 76, has the Q output coupled via a terminal 54A to the indicator control circuit 56. A clock pulse P2 from the clock generator is coupled by way of the terminal 44 to the clock input of the flip flop 84. A dashed line 85 encloses those elements which it is most desirable to provide on a single integrated circuit chip. The operation of the logic circuit 32 will be explained in connection with the waveform charts of FIGS. 3-5.

Figure 3:
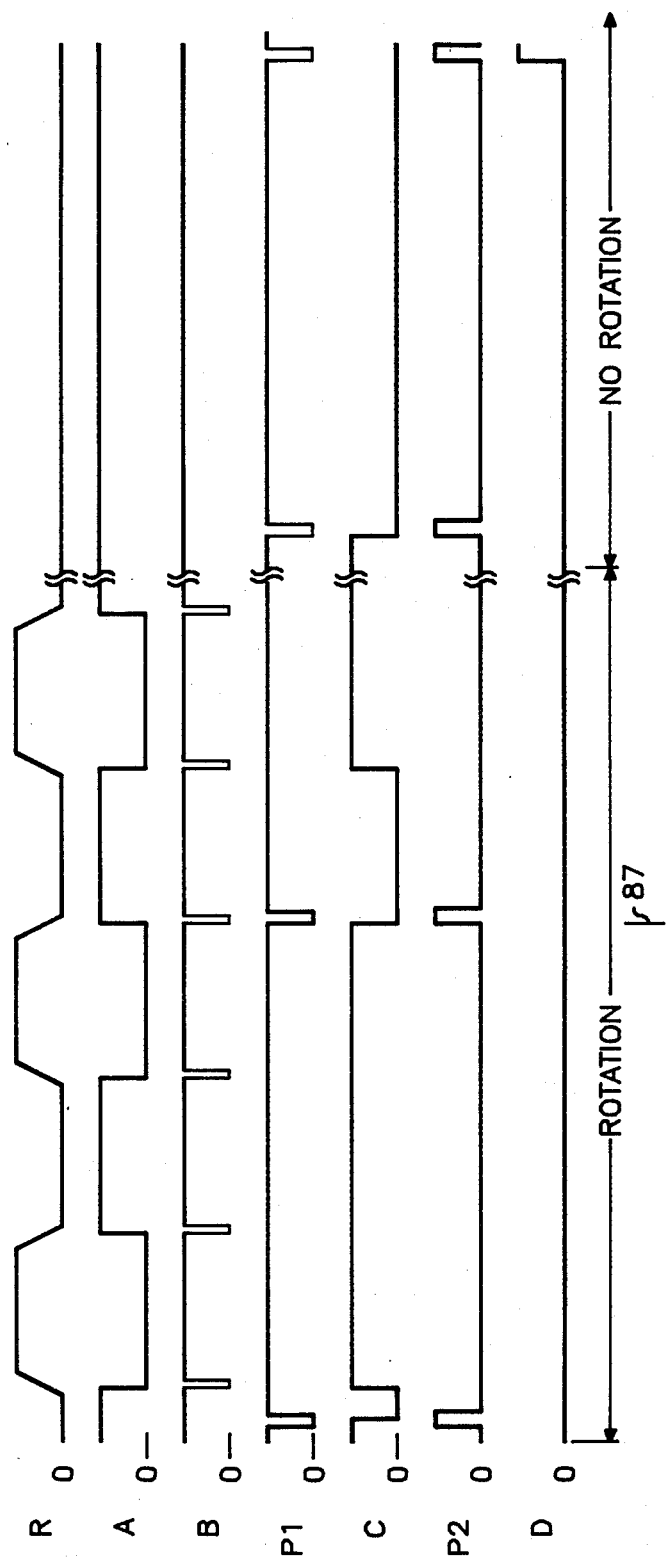
FIGS. 3-5 are timing diagrams of the main waveforms of the circuit of FIG. 2 in the three operating modes.
Figure 4:
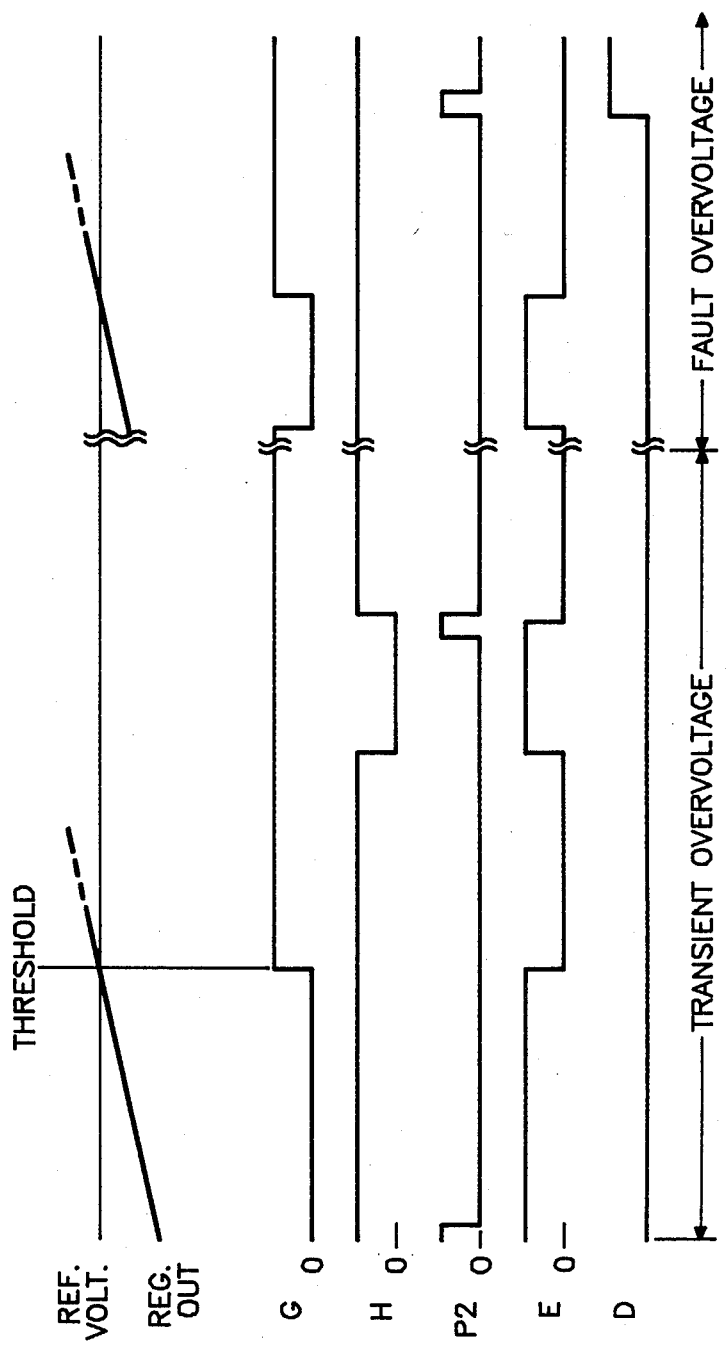
Figure 5:
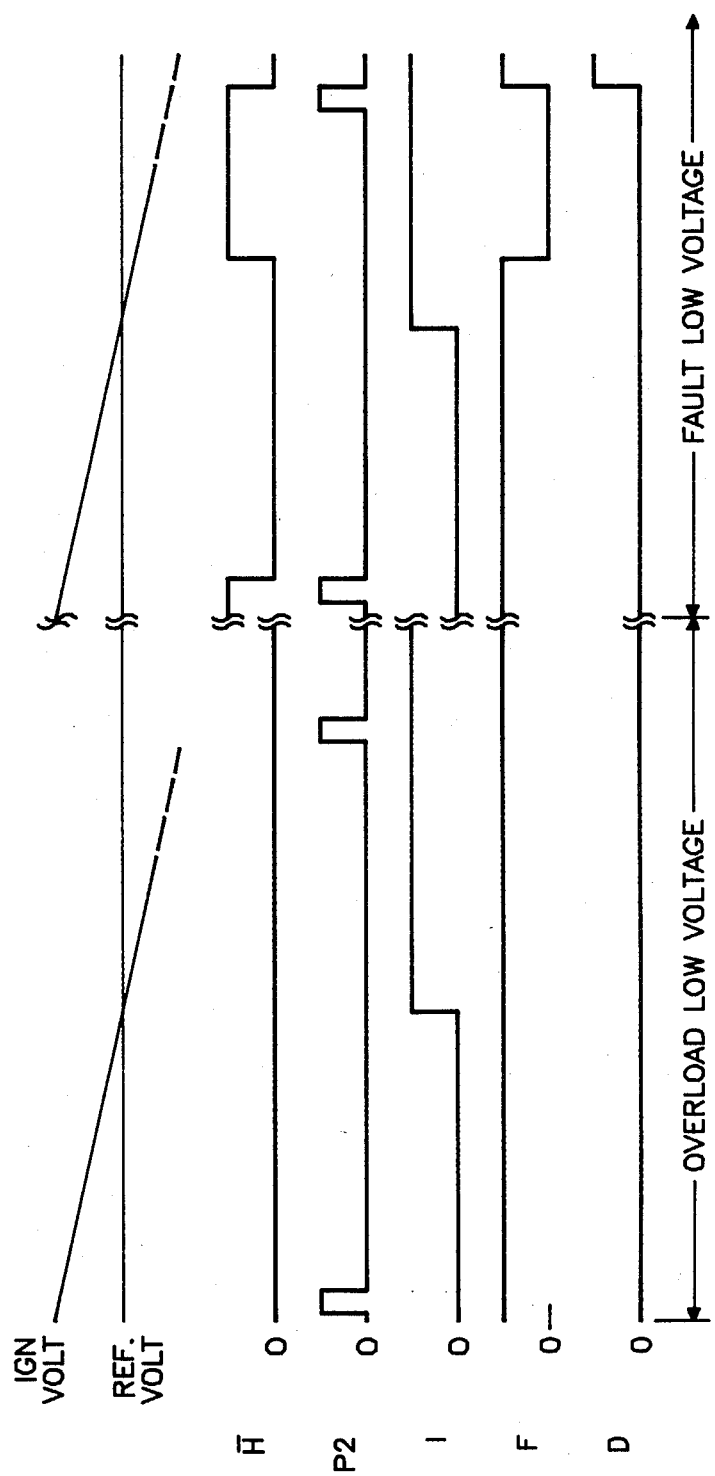

The waveform charts of FIGS. 3-5 may be seen to relate to the detection of certain engine faults as mentioned above. The first portion of each chart shows a possible "fault" condition while the second part of each chart represents an actual fault detection. FIG. 3 is related to the detection of "rotation/non-rotation" which, in actuality, can mean any of the following:
(1) Ignition on, engine not started
(2) Fan belt broken
(3) Field coil open circuit or disconnected
(4) Field coil short circuit
(5) Disconnection of sense wire.

In the circuit of FIG. 2, a signal comes from the alternator winding 18 by way of a tap 20 (See FIG. 1). This signal is represented by "R" in FIG. 3. This waveform will be something between a relatively pure sine wave (100% duty cycle) and a very clipped wave, depending on the amount of regulation. The minimum duty cycle is never zero, even with maximum regulation. In order to avoid problems with DC voltage due to rectifier leakage, this signal is coupled through the comparator 70 which also has hysteresis for noise suppression. The output of the comparator 70 is the signal "A". This signal is coupled through the differentiator 72 which is made up of I²L logic gates and which provides a negative output pulse, as seen in signal "B," for each transition of signal "A." This doubling of the frequency is not necessary to operation of the invention but may, in some applications, be needed in order to prevent a false indication. This would happen when the frequencies of the regulator and the alternator output were such that no pulse from the differentiator arrived during one regulated period.

Whenever there is at least one pulse "B" during the regulated period, the flip flop 74 will be set, then reset by the subsequent pulse P1 as seen at a point 87 in FIG. 3. The output "C" of the flip flop 74 is then coupled through the NAND 76 and latched by the flip flop 84. Then, clocked by the next pulse P2 from terminal 44, the flip flop 84 output "D" is coupled to the lamp control circuit 56. In this instance, the lamp will not be lit since "D" is zero, showing that "rotation" is present.

The second half of FIG. 3 shows the signals for the true "non-rotation" condition. When the signal "R" from the tap 20 of alternator goes low for whatever reason and stays low, the output "A" of the comparator 70 goes high and stays high, and the differentiated signal "B" goes high and stays high. With no pulse from the differentiator 72 to set the flip flop 74, the "Q" output signal "C" again goes low and, at the next pulse P2, the "D" signal is latched high, indicating "non-rotation".

FIG. 4 shows the timing diagrams relating to the detection of an overvoltage condition. Here the problem is to distinguish between a transient voltage rise and a true overvoltage condition. A true fault could be caused by any one of the following:
(1) Field coil shorted to ground
(2) Drive Darlington shorted to ground
(3) A fault in the regulator circuit.
A transient condition could be caused by a heavy load being removed while the battery was fully charged. In the case of a real fault, the signal "H" from the NAND 82 will be high, as will be explained later. Therefore, if any overvoltage is detected while signal "H" is high, a true fault condition is present.

In the case of a transient overvoltage condition, when the signal coming from the regulator output terminal 48 into the comparator 66 is higher than the threshold point of the reference voltage on terminal 38B, the output signal "G" of the comparator goes high. When signal "G" is NANDed with signal "H" (which is still low), the result is signal "E". When signal "E" is coupled through the inverting gate, NAND 76, to the data input of the flip flop 84, the Q output signal "D" stays low when clocked by the signal P2, indicating "no fault".

In the second part of FIG. 4, again the regulator output signal rises until it passes the threshold of the reference voltage, and the signal "G" goes high. In this instance, however, the signal "H" is also high since a true fault of some sort exists. The resultant NANDed signal "E" goes low and stays low. When "E" is inverted by NAND 76 and coupled to the data input of the flip flop 84, the flip flop output signal "D" goes high at the clock pulse P2, accurately indicating a fault.

Returning to the signal "H" and the circuit including NAND gates 80, 82, and transistor T1, the signal received at the terminal 50 is representative of the status of the Darlington driver circuit 22. Since, in each of the fault overvoltage conditions, the Darlington collector voltage will be continuously low, the voltage at the terminal 50 will be low. In the event of a transient overvoltage, the Darlington collector voltage will be high since the circuit will be off at the end of the regulate period. This is proper because the regulator will be working correctly to reduce the output voltage.

In FIG. 5, "undervoltage" conditions are shown; the first part showing a low voltage caused by an overload condition, and the second part showing low voltage caused by a true fault. The latter condition would likely be the result of an open circuit in the alternator-battery connection. If the regulator output voltage drops below the reference voltage at the comparator 62 input, the comparator output signal "I" would go high. When signal "I" is NANDed with the inverse of signal "H" in NAND 64, the resultant output signal is the signal "F". Since the not-H signal stays low in the case of a transient under voltage, due to the fact that the Darlington drive circuit is "on" and the system is operating at full capacity, the signal "F" stays high. The "D" signal also stays low, indicating "no fault" and the lamp 58 is not lit.

In the second part of FIG. 5, again the regulator output voltage drops but, in this instance, due to a true fault. Now, when the threshold is crossed and signal "I" goes high, the not-H signal is also high and the output "F" of the NAND 64 goes low. The signal "F", coupled through the NAND 76 to the flip flop 84, will cause the output signal "D" of the flip flop to go high, enabling the indicator circuit 56 and lighting the "fault" lamp 58.

In FIG. 6 may be seen one embodiment of the differentiator 72. This 7-gate logic circuit will not only provide a wider pulse (approx. three propagation delays wide), but provides two "B" pulses out for each input "A" pulse. This wider pulse is needed for activating the flip flop 74.

Thus, there has been shown and described a circuit which, at low cost and with a minimum of elements, provides essentially error-free detection of three possible faults in the ignition system of a vehicle. Simple combinations of logic elements serve to enable a single indicator, such as a lamp, for alerting the user of the vehicle that a significant problem exists and that service for the vehicle should be obtained as soon as possible. Apparent faults are prevented from activating the indicator.

I claim:

1. A multifunction fault detector as for use in a vehicle alternator system and comprising:

first detector means for detecting that a first voltage derived from said alternator is within a predetermined range and providing a first detector output signal in response thereto, a voltage within said predetermined range indicating the presence of a possible fault in the system;

second detector means for detecting that the field coil of the alternator is being driven and providing a second detector output signal in response thereto, said second detector output signal indicating fault verification;

first logic means coupled to the first and second detector means for providing a logic output signal having a first value when said first and second detector output signals indicate that no fault or only a possible fault exists and providing output signal pulses having a second value when an actual fault is verified, said logic means including logic elements for broadening said signal pulses internal to said logic means;

second logic means coupled to the first logic means for providing a sustained output signal in response to said second valve of said first logic means output signal pulses; and indicator means coupled to the second logic means for being enabled only by said sustained output signal.

2. A multifunction fault detector in accordance with claim 1 and wherein the first detector means includes a plurality of inputs from the alternator, a plurality of separate detectors, each detector having a distinct, predetermined operating range, and each detecting one of such apparent faults as overvoltage, undervoltage or lack of rotation of the alternator.

3. A multifunction fault detector in accordance with claim 1 and further including voltage reference means for providing at least one reference voltage to the first detector means, and wherein the first detector means include comparator means for comparing an input voltage with a reference voltage.

* * * * *